United States Patent
Hayward et al.

(10) Patent No.: US 6,640,165 B1
(45) Date of Patent: Oct. 28, 2003

(54) METHOD AND SYSTEM OF DETERMINING ALTITUDE OF FLYING OBJECT

(75) Inventors: Kirk W. Hayward, Beverly Hills, CA (US); Larry G. Stephenson, Norman, OK (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/304,720

(22) Filed: Nov. 26, 2002

(51) Int. Cl.[7] .............................................. G02B 23/10
(52) U.S. Cl. ............................... 701/4; 701/10; 701/14; 340/970; 73/384
(58) Field of Search ........................... 701/4, 5, 10, 14, 701/207; 342/38; 340/970; 73/384, 179, 30.01, 30.04, 387; 702/139

(56) References Cited

U.S. PATENT DOCUMENTS

| | | |
|---|---|---|
| 4,106,094 A | 8/1978 | Land |
| 4,675,823 A | 6/1987 | Noland, deceased |
| 4,882,697 A | 11/1989 | Ross |
| 5,224,059 A | 6/1993 | Nitta et al. |
| 5,402,116 A | 3/1995 | Ashley |
| 5,671,162 A * | 9/1997 | Werbin ...................... 702/139 |
| 6,094,607 A | 7/2000 | Diesel |
| 6,154,143 A | 11/2000 | Robinson |
| 6,216,064 B1 | 4/2001 | Johnson et al. |
| 6,237,405 B1 | 5/2001 | Leslie |
| 6,263,263 B1 | 7/2001 | Shehi et al. |
| 6,266,583 B1 | 7/2001 | Tazartes et al. |

* cited by examiner

Primary Examiner—Richard M. Camby
(74) Attorney, Agent, or Firm—Stetina, Brunda Garred & Brucker (57) ABSTRACT

A method of determining an altitude of a flying object. A Blanchard altitude of a flying object is computed. A non-Blanchard reference altitude and a trajectory of the flying object are measured and input to a Kalman filter. In the Kalman filter, the non-Blanchard reference altitude and the trajectory are processed to derive a radius of jet stream curvature. A gradient wind correction factor is then computed as a function of the radius of jet stream curvature. The Blanchard altitude is then corrected in response to the gradient wind correction factor.

15 Claims, 5 Drawing Sheets

METHOD AND SYSTEM OF DETERMINING ALTITUDE OF FLYING OBJECT

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to a method and a system for determining altitude of a flying object, and more particularly, to a method of determining altitude of a flying object based on a gradient wind error model for the Blanchard algorithm.

The measurement of altitude of an aircraft can be obtained by various approaches. For example, by installing an accelerometers in an inertial navigation system in the aircraft, the altitude can be determined from a measured acceleration in the vertical direction by performing a double time integration of the measured vertical acceleration. Unbounded errors often occur to the altitude obtained from the accelerometer since the acceleration bias leads to exponential growth in the altitude.

The other commonly approach for the altitude measurement of an aircraft is the barometric altimeter. The barometric altimeter provides the altitude information as a function of barometric pressure based on a direct relationship between pressure and altitude. Barometric altitude, also known as pressure altitude, is determined as a function of pressure based on a standard day model for the atmosphere. As the atmospheric conditions encountered by an aircraft usually differs from the conditions defined by the standard day model, significant error may occur.

Decades ago Blanchard proposed an algorithm for computing the altitude of a flying object from atmosphere and temperature data as determined by sensors on board the flying object. Unlike the previous algorithm of pressure-altitude, which used an average temperature based on a standard model, Blanchard had more flexibility to adjust for variations in temperature caused by non-standard days. In further development, Blanchard modified his algorithm by incorporating additional term involving the motion of the atmosphere. The pressure altitude obtained by the original Blanchard algorithm is referred as Blanchard altitude, which can be referred to "A New Algorithm for Computing Inertial Altitude and Vertical Velocity" by R. L. Blanchard, in IEEE Transaction on Aerospace and Electronic Systems, Vol. AES-7, November. The modified Blanchard algorithm can be referred to "An Improvement to an Algorithm for Computing Reference Altitude", IEEE Transactions on Aerospace and Electronic Systems, Vol. AES-8, No. 5, September 1972.

Figure 1:
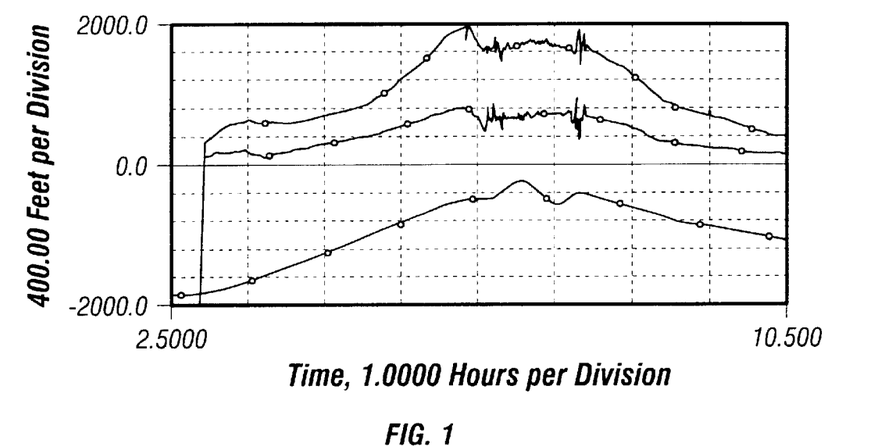
FIGS. 1 and 2 show the altitude errors as a function of time and latitude for two flights over the continental United states derived from Blanchard algorithm.
Figure 2:
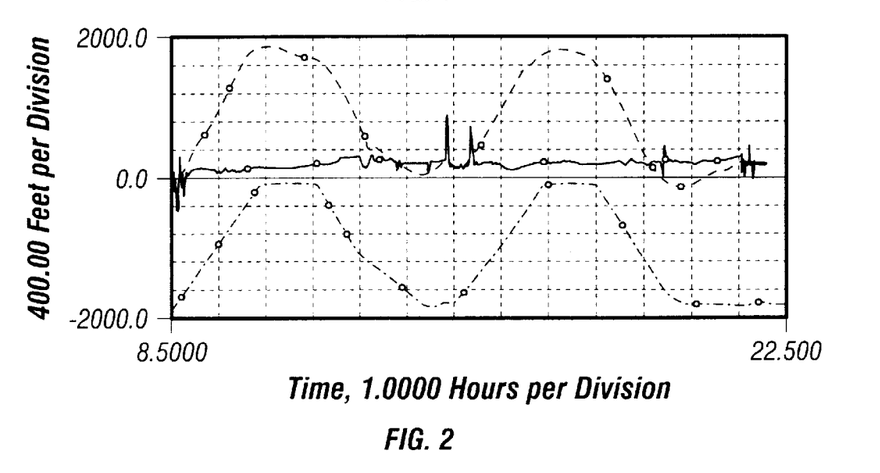

The development of radar system and GPS in recent years enables the user to compute the accuracy of Blanchard algorithm. FIGS. 1 and 2 show the errors of altitude for flight number 1 and flight number 2 flying over the continental United States measured by original and modified Blanchard algorithms. The errors were computed by subtracting GPS altitude from the output of the Blanchard algorithms. In FIGS. 1 and 2, the curves labeled by "a" and "b" show errors for the original and modified algorithms of Blanchard, while the curve c shows the latitude as a function of time for these two flights. The original algorithm appears to have a noticeable build-up of error whenever the latitude of the flight changes. When the latitude increases, the altitude error becomes larger in a positive sense indicating that the altitude estimated by Blanchard algorithm is too high. On the other hand, this indicates that the pressure is lower than expected.

Figure 3:
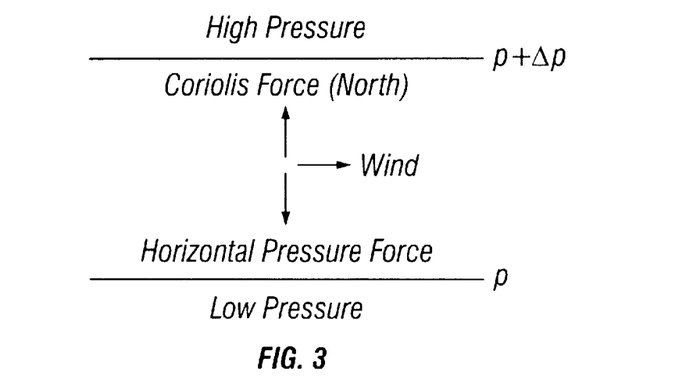
FIG. 3 shows the balance of forces and resulting geostrophic wind in the Southern Hemisphere.

The decrease in pressure with latitude in the upper atmosphere is well known in meteorology as shown in upper air chart in FIG. 3. FIGS. 1 and 2 demonstrate the improvement of the modified algorithm; yet, the improvement varies significantly. For flight number 1, there was still a large remaining error, while flight number 2 had a residual error comparable to the accuracy of GPS itself.

Although GPS and radar system provides an accurate altitude for the flying object, there may be periods of time when the signal is unavailable. A system relying on an external signal is more vulnerable than a system contained within the flying vehicle. Therefore, there is a need to provide a method for determining the altitude of a flying object with improved accuracy according to the data measured from an onboard inertial navigation and data system.

SUMMARY OF THE INVENTION

The present invention provides a gradient wind error model, based on the model, a more accurate altitude of a flying object can be determined by correcting the Blanchard algorithm. The method of determining the altitude of a flying object comprises the following steps. A Blanchard altitude of a flying object is computed. A non-Blanchard reference altitude of the flying object is measured. The non-Blanchard reference altitude is compared to the Blanchard altitude to obtain a correction factor of the Blanchard altitude. The correction factor of the Blanchard altitude is then input to a Kalman filter for processing, so as to compute a radius of jet stream curvature. A gradient wind correction factor is then computed as a function of the radius of jet stream curvature, such that the Blanchard altitude can be corrected in response to the gradient wind correction factor.

In the above method, the non-Blanchard reference altitude is measured by a GPS system, a radar measurement system, or a double integration of the acceleration of the flying object measured from an accelerometer. A Kalman filter is used to process the non-Blanchard reference altitude and the trajectory of the flying object for deriving the radius of the jet stream curvature.

In the step of deriving the radius of the jet stream curvature, the linear relationship between the non-Blanchard reference altitude and the trajectory and the radius of the radius of jet stream curvature. The relationship can be expressed as:

$$\frac{\partial z}{\partial (\delta h)} = 1 \text{ and } \frac{\partial z}{\partial (\delta u)} = -\int_0^T f(t)dt,$$

where z is the measurement data of altitude, $\delta h$ is the error of the trajectory, and $\delta u$ is the error of the inverse of the radius of the jet stream curvature, T is the total flying time of the flying object, and f(t) is a function of the flying time t. The gradient wind correction factor is the product of the inverse of the radius of the jet stream curvature and an integration of the function f(t) over the flying time.

After the radius of the jet stream curvature is obtained, the gradient wind correction factor can be computed by a product of the inverse of the radius of jet stream curvature and an integration of f(t) over the flying time.

The present invention further provides an inertial navigation and data system for implementing the gradient wind error model. The system comprises a Blanchard altitude computing processor, a reference altitude measurement system, an inertial measurement device, a Kalman filter, and a correction processor. The Blanchard altitude computing processor is used to compute a Blanchard altitude of the flying object based on temperature and pressure encountered thereby. The trajectory of the flying object is measured by the trajectory measurement device. The altitude measurement system is used to measure a non-Blanchard reference altitude. The trajectory and the non-Blanchard reference altitude are then input to the Kalman filter to compute the radius of jet stream curvature. The Blanchard altitude, the radius of jet stream curvature, and the trajectory are then input to the correction processor to compute a gradient wind correction factor, which is then used to correct the Blanchard altitude.

BRIEF DESCRIPTION OF THE DRAWINGS

These, as well as other features of the present invention, will become more apparent upon reference to the drawings wherein.

DETAILED DESCRIPTION OF THE INVENTION

As mentioned above, the Blanchard algorithm that calculates the altitude of a flying object by considering the temperature and the motion of the atmosphere encountered by the flying object is still inaccurate compared to the GPS measurement. The inaccuracy increases when the latitude of flying object is higher. The present invention provides a method to correct the error of the altitude calculated by the modified Blanchard algorithm, and thus provides a reliable fall back source for altitude measurement when the external signal such as the GPS system is not available.

As a known meteorologic phenomenon, the differential heating of the equatorial and polar-regions of the atmosphere causes the pressure decreased with latitude. This results in a horizontal (latitudinal) pressure gradient in the upper atmosphere. A parcel of air will thus experience a pressure force proportional to the pressure gradient, and the direction of the pressure force is from the equator to the poles. Under the influence of the pressure force, the air tends to flow from the equator to the poles. However, the Coriolis force prevents the air flowing from the equator to the poles by deflecting it into a west-to-east flow in the Northern and Southern hemispheres. The balanced forces and the resulting wind in the Southern Hemisphere is shown as FIG. 3.

The west-to-east flow of the air, that is, the wind, in the upper atmosphere is the so-called jet stream familiar to many travelers who, for example, fly back and forth between the West and the East Coasts of the continental United States. The jet stream is usually located in the middle latitudes because most of the temperature change between the equator and the poles occurs in this region.

Figure 4:
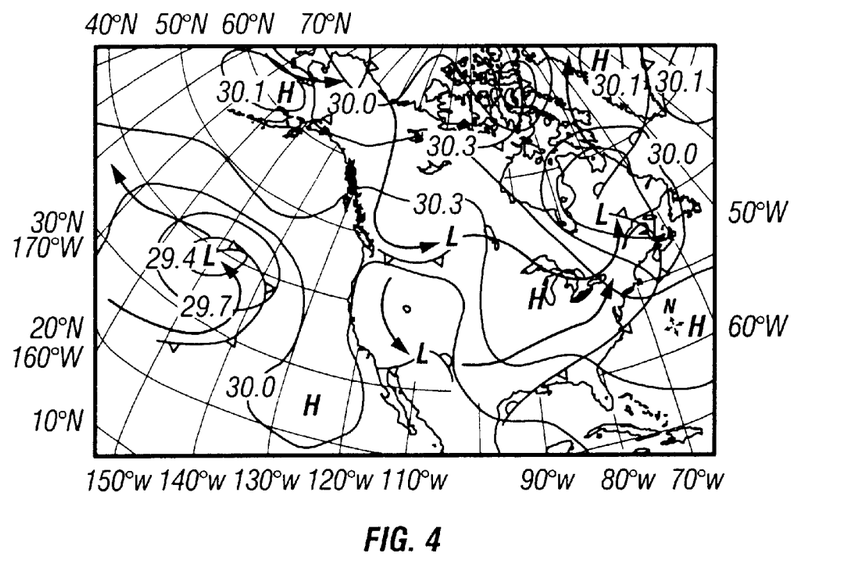
FIG. 4 shows the jet stream on Mar. 26, 1996 under which flight number 1 is flying.

As shown in FIG. 4, due to various weather factors, the jet stream is not always directed precisely from west to east, but is often directed with a curvature. As shown in FIG. 4, the jet stream was curving to the left. This implies the horizontal pressure force was larger than the Coriolis force. From the weather map as shown in FIG. 4, the wind was curving around a low-pressure region, or in meteorological parlance, a "trough". If one uses the Blanchard algorithm to calculate the altitude of an object flying under such jet stream, the decrease of pressure will be misinterpreted as an increase in altitude. Therefore, a positive error is generated in the altitude of flight number 1 calculated by Blanchard algorithm. In this example, the jet stream was heading almost due south when flight number 1 starts flying. It then curved around to the left until the flight number 1 was heading north.

Figure 5:
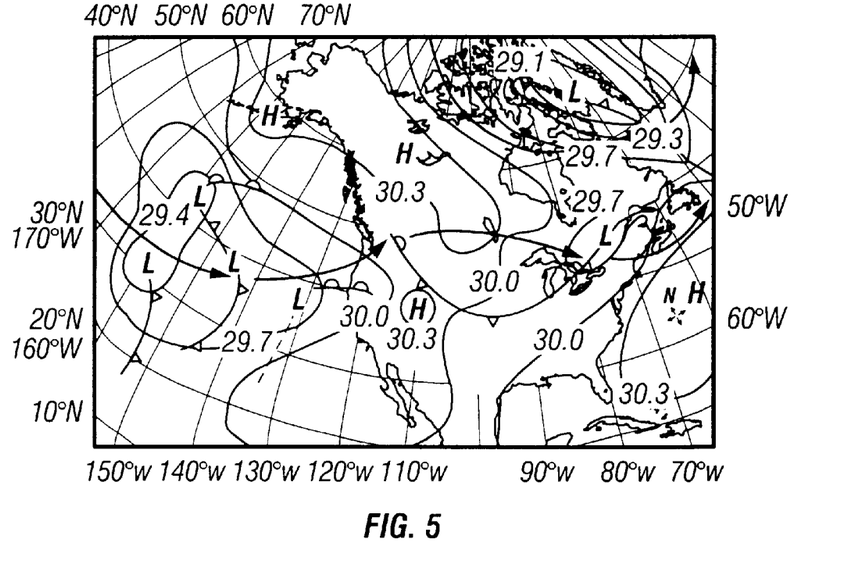
FIG. 5 shows the jet stream on Jan. 22, 1997 under which flight number 2 is flying.

Conversely, FIG. 5 shows that there was little or no curvature of the jet stream under which the flight number 2 is flying. Therefore, the Blanchard algorithm performs the excellent altitude determination during the flight as shown in FIG. 2. Hence, the accuracy of the Blanchard algorithm appears to be sensitive to climatological effects.

To account for the curvature in the flow, that is, a gradient wind model is used. As the name implies, a gradient wind occurs when the velocity of a parcel of air is changing with time. However, the change is limited to direction only, and the magnitude is assumed to be constant. It is also assumed that (referring to Dynamics of Atmospheric Motion by J. A. Dutton and published in New York, Dover Publication Inc., 1995, ch 9, pp. 311–315) the gradient wind is predominantly caused by a small imbalance between the horizontal pressure force and the Coriolis force.

Hereinafter, the Blanchard equation is modified by incorporating parameters related to the gradient wind. As mentioned above, Blanchard algorithm assumed that the horizontal pressure force and the Coriolis forces are equal and opposite in direction, so that there is no net force exerted on the air. In this case, the wind is not accelerating and the flow is steady or unchanging. In contrast, in the gradient wind model, the horizontal pressure and the Coriolis force may not be equal. It is assumed that the resulting net force causes the wind to change directions, while the magnitude thereof remains constant. This simple type of motion of the wind is described by the expression for centripetal acceleration:

$$\dot{w} = \frac{w^2}{R} \quad (1)$$

Where w is the magnitude of the wind velocity and R is the radius of the curvature of the wind flow. Using the gradient wind model from Dutton, the above equation is written in vector form using a coordinate system where the axis 1, and consequently the unit vector $\hat{i}$ of this axis 1, is pointing up. The gradient wind, that is, the acceleration of the wind is:

$$\vec{\dot{w}} = \frac{w}{R} \hat{i} \times \vec{w} \quad (2)$$

In equation (2), $\overline{w}$ is the wind vector. The rotation directional sign is attached to the radius of the curvature of the wind flow. R is positive if the acceleration of the wind is to the left of the wind velocity vector $\vec{w}$, and negative if it is to the right thereof. In the Northern Hemisphere, the circulation of the wind will be cyclonic if R is positive and anticyclonic if R is negative.

From Newton's second law, the sum of forces per unit mass on a parcel of air equals the acceleration as measured in an inertial frame of reference. By summing the pressure and gravitational forces, the equation of wind motion can be written as:

$$-\frac{1}{\rho}\nabla p + \vec{G} = \dot{\vec{w}} \qquad (3)$$

Where $\rho$ is the mass density of the air parcel, and $\nabla p$ is the pressure gradient of the air. In a coordinate frame rotating the earth, this equation becomes:

$$-\frac{1}{\rho}\nabla p + \vec{g} = \dot{\vec{w}} + 2\vec{\Omega}\times\vec{w} \qquad (4)$$

where $$g = G - \Omega \times (\Omega \times r) \qquad (5)$$

and the time derivatives of each term in equation (4) are now with respect to the rotating frame. $\Omega$ in the last equation is the earth rotation rate vector. In order to derive an expression for the pressure gradient term, pressure will be a function of both position and time in general.

$$p = p(i_1, i_2, i_3) \qquad (6)$$

The total derivative is:

$$\frac{dp}{dt} = \frac{\partial p}{\partial i_1}\frac{di_1}{dt} + \frac{\partial p}{\partial i_2}\frac{di_2}{dt} + \frac{\partial p}{\partial i_3}\frac{di_3}{dt} + \frac{\partial p}{\partial t} \qquad (7)$$

The dominant term in the equation (7) is of course the change in pressure with altitude. In the upper atmosphere, a significant change in pressure with horizontal position is existent if the latitude of the vehicle changes appreciably. The last term in equation (7) is the change in pressure with time associated with local changes in the weather. By ignoring this term, equation (7) becomes:

$$\frac{dp}{dt} = \vec{v}\cdot\nabla p \qquad (8)$$

where $\vec{v}$ is the velocity of the flying vehicle. Taking the dot product of equation (4) with the vehicle velocity, and using equation (8), $$\frac{1}{\rho}\frac{dp}{dt} = \vec{v}\cdot\vec{g} - 2\vec{v}\cdot\vec{\Omega}\times\vec{w} - \vec{v}\cdot\dot{\vec{w}} \qquad (9)$$

Using equation (2) and the vector identity:

$$\vec{A}\times\vec{B}\cdot\vec{C} = \vec{B}\times\vec{C}\cdot\vec{A} \qquad (10)$$

The following expression is obtained:

$$\frac{1}{\rho}\frac{dp}{dt} = \vec{v}\cdot\vec{g} - \left(2\vec{\Omega} + \frac{w}{R}\hat{i}\right)\cdot\vec{w}\times\vec{v} \qquad (11)$$

Since the wind and the vehicle velocity vectors are essentially horizontal, the cross product thereof will be along the vertical direction. Hence, the terms involving the horizontal components of the earth's rotation vector can be neglected. The small horizontal components of the earth's gravity field is also neglected, so that:

$$\frac{1}{\rho}\frac{dp}{dt} = g_1 v_1 - \left(2\Omega\sin\phi + \frac{w}{R}\right)(\hat{i}\cdot\vec{w}\times\vec{v}) \qquad (12)$$

Where $\emptyset$ is latitude. For the nominal atmosphere flowing west to east, the cross product in the above equation is largest when the vehicle latitude is changing. By writing out the cross product explicitly and using $$v_1 = \frac{di_1}{dt} \qquad (13)$$

$di_1$ is solved as:

$$di_1 = \frac{1}{g_1}\left[\frac{dp}{\rho} + \left(2\Omega\sin\phi + \frac{w}{R}\right)(w_2 v_3 - w_3 v_2)dt\right] \qquad (14)$$

When R approaches infinity, it indicates that the curvature of the jet stream is negligibly small, such that the accurate altitude of the vehicle can be calculated using the Blanchard algorithm. That is, the above equation (14) reduces to the differential equation that Blanchard algorithm uses to calculate the altitude. Otherwise, the altitude calculated by using the Blanchard algorithm is corrected by the term (w/R)(w$_2$v$_3$−w$_3$v$_2$) dt as a function of the radius of the curvature of the jet stream.

From Equation (14), the altitude of the vehicle can be obtained when the radius of the curvature of the -et stream is given. Within a single parcel of air, the radius of the curvature of the jet stream can be computed by measuring the wind velocity at successive intervals of time. However, as the vehicle may cut across different parcels of air during the intervals of time, the acceleration of a single parcel of air cannot be obtained. Consequently, the radius of the curvature of the jet stream cannot be derived by directly calculating the change in velocity of the wind. Instead of directly computing the change in the wind, the Equation (14) is used to derive a new error model for the Kalman filter. This 1s accomplished by replacing the barometric bias with a state related to the radius of curvature of the jet stream. With this approach, the navigation Kalman filter is used to estimate the amount and direction of the curvature.

Information about the barometric bias comes from other measurements, for example, radar altitude, GPS or even the altitude obtained from the accelerometer during periods of extended climbs after the vehicle has taken off.

By integrating equation (14) and representing $i_1$ by the height of the vehicle h, the following equation is obtained.

$$h = h_B + \int_0^T \frac{w}{gR}(w_2 v_3 - w_3 v_2)\,dt \qquad (15)$$

In Equation (15), $h_8$ is the altitude calculated using the Blanchard algorithm, that is, the integration of:

$$\frac{1}{g_1}\left(\frac{dp}{\rho} + 2\Omega \sin\phi \, dt\right),$$

and T is the time since the Blanchard algorithm starts calculating. The weather maps show the radius of curvature to be a slowly varying function with time. Assuming it to be a constant in the above integration, $$h = h_B + u \int_0^T f(t) \, dt \tag{16}$$

where $$u = \frac{1}{R}, \text{ and} \tag{17}$$

$$f(t) = \frac{w}{g}(w_2 v_3 - w_3 v_2)$$

The change in variable to inverse radius of curvature has several advantages. Mathematically u is easier to work with because it is zero instead of infinity when the atmosphere is in its normal state. Having the error go to zero in the undisturbed state is easier to implement in the Kalman filter. Further, as will be shown, the error equations for u is linear. To compute the errors for the filter, the true values $\bar{h}$ and $\bar{u}$ of a variable h and u are the estimate values $\hat{h}$ and $\hat{u}$ plus the error $\delta h$ and $\delta u$, respectively:

$$\bar{h} = \hat{h} + \delta h \tag{18}$$

$$\bar{u} = \hat{u} + \delta u \tag{19}$$

With the definitions, equation (16) becomes:

$$\bar{h} = h_B + \bar{u} \int_0^T f(t) \, dt, \tag{20}$$

and the measurement presented to the Kalman filter is:

$$z = h_B + \hat{u} \int_0^T f(t) \, dt - \hat{h} \tag{21}$$

The second term on the right hand side of equation (21) is a quantity used to correct subsequent measurements (it is zero for the first measurement). Introducing Equations (18), (19) and (20) into Equation (21), $$z = \delta h - \delta u \int_0^T f(t) \, dt - \hat{h} \tag{22}$$

By introducing equations (18), (19) and (20) into the equation of z (21), the measurement change can be derived from the partial derivatives:

$$\frac{\partial z}{\partial (\delta h)} = 1, \tag{22}$$

$$\frac{\partial z}{\partial (\delta u)} = -\int_0^T f(t) \, dt$$

The relationship between the wind trajectory, that is, the radius of the curvature of the wind (1/R=u), and the trajectory of the vehicle, that is, h, are thus presented as Equation (22).

Figure 6:
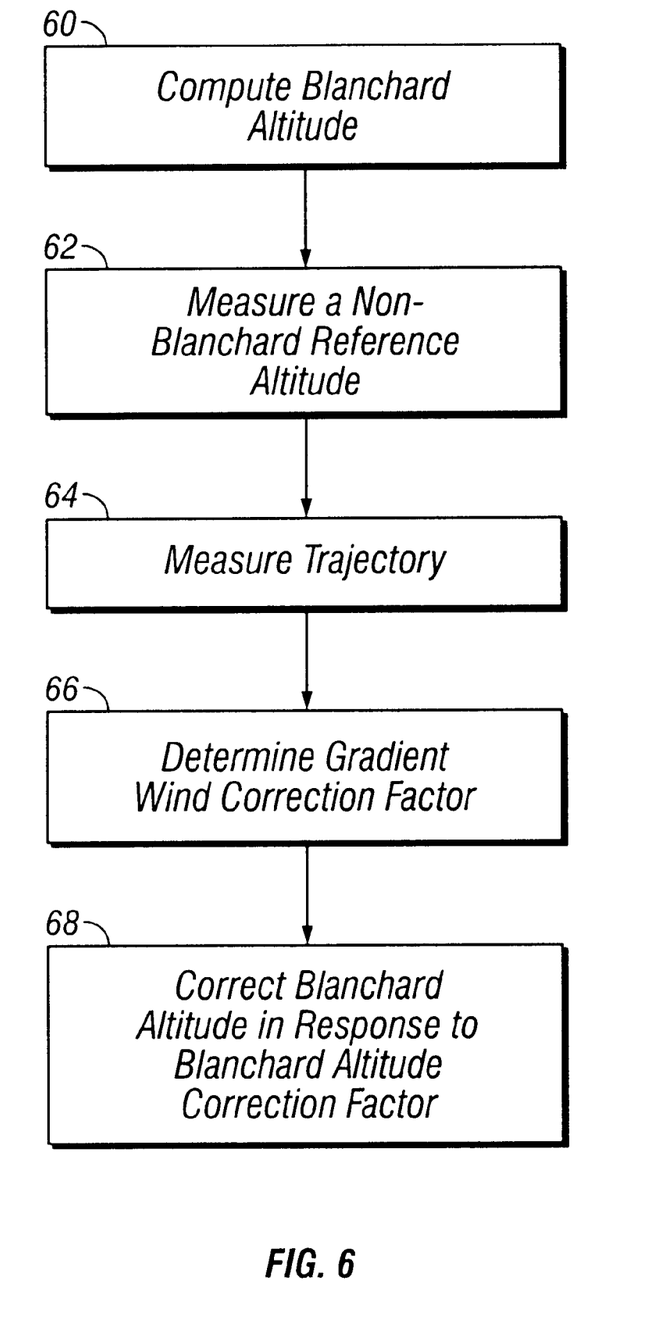
FIG. 6 shows the process flow of the method of determining the altitude of a flying object in one embodiment of the present invention.

FIG. 6 shows a process flow of measuring the altitude of a flying object according to the present invention. In step 60, a Blanchard altitude of the flying object is computed. The Blanchard altitude is computed in response to temperature and pressure measured by a sensor of an inertial navigation and data system installed in the flying object. In step 62, a non-Blanchard reference altitude of the flying object is measured. As the Blanchard altitude has a significant error when the radius of the curvature of the jet stream is a finite value, another measurement is used to obtain the Blanchard altitude correction factor. The non-Blanchard reference altitude can be measured by a GPS measurement, a radar altitude measurement, or a double integration of acceleration obtained from an accelerometer installed in the inertial navigation and data system. In addition to the non-Blanchard reference altitude, the trajectory information of the flying object is also measured in step 64. The non-Blanchard reference altitude and the trajectory information are then input to a Kalman filter to compute the gradient wind correction factor in step 66. In step 68, the Blanchard altitude is then corrected by the gradient wind correction factor. In the above process, upon the receipt of the non-Blanchard reference altitude and the trajectory of the flying object, the Kalman filter derives a radius of jet stream curvature based on a linear relationship between the non-Blanchard reference altitude and the trajectory of the flying object, and a linear relationship between the non-Blanchard reference altitude and the inverse of the radius of the jet stream curvature as expressed in Equation (22). When the radius of jet stream curvature is derived, the gradient wind correction factor inversely proportional to the radius of jet stream curvature can be obtained.

Figure 7:
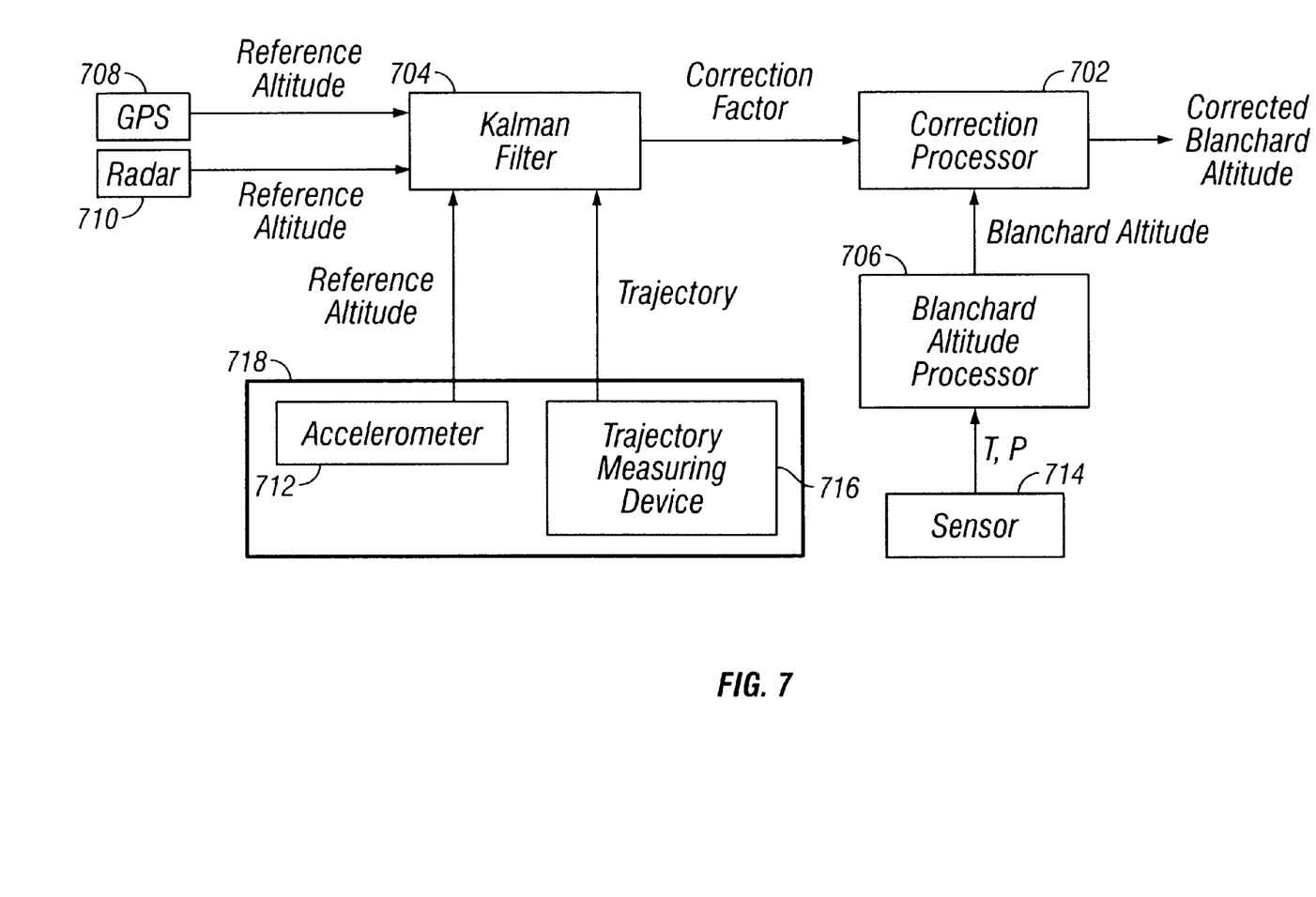
FIG. 7 shows a block diagram of the system for implementing the gradient wind error model.

According to the above process, the gradient wind error model can implemented into the inertial navigation and data system of the flying object to provide a more accurate altitude information compared to the altitude obtained by Blanchard algorithm and the double integration of the vertical acceleration. Therefore, when the external system such as GPS or radar system is unavailable, the implementation of the gradient wind error model is a reliable fall back source for altitude determination. FIG. 7 shows a system to implement the gradient wind error model. As shown in FIG. 7, the system includes a reference altitude measurement system such as a GPS measurement system 708, a radar altitude measurement system 710, or an accelerometer 712, a Kalman filter 704, a trajectory measurement device 716, a sensor 714, a Blanchard altitude processor 706, and a correction processor 702. Preferably, both the accelerometer 712 and the trajectory measuring device 716 are installed in an inertial measurement system 718.

The sensor 714 is used to measure the temperature and pressure information input to the Blanchard altitude processor 706, and a Blanchard altitude is thus computed thereby. As mentioned above, there is a significant error of the Blanchard altitude when a finite radius of jet stream curvature exists. Therefore, a correction value for the Blanchard altitude is required to obtain the more accurate altitude information. The Blanchard altitude is thus input to a correction processor 702 to be corrected. The reference altitude measurement system 708, 710 or 712 is used to measure a non-Blanchard reference altitude provided to the Kalman filter 704. The non-Blanchard reference altitude can be obtained from an external GPS system 708, an external radar system 710, or derived by a double integration of acceleration measured from an accelerometer 712 built in an inertial navigation and data measurement system 718 of an aircraft. In addition to the non-Blanchard reference altitude, another signal carrying the information of trajectory is provided to the Kalman filter 704. The trajectory information is measured by a trajectory measurement device 716. In the Kalman filter 704, the trajectory and the non-Blanchard reference altitude are processed to obtain the radius of jet stream curvature. In response to the radius of jet stream curvature, a gradient wind correction factor is computed by the correction processor 702. As a result, the gradient wind error of the Blanchard altitude is eliminated, and a more accurate measurement of altitude is obtained.

Figure 8:
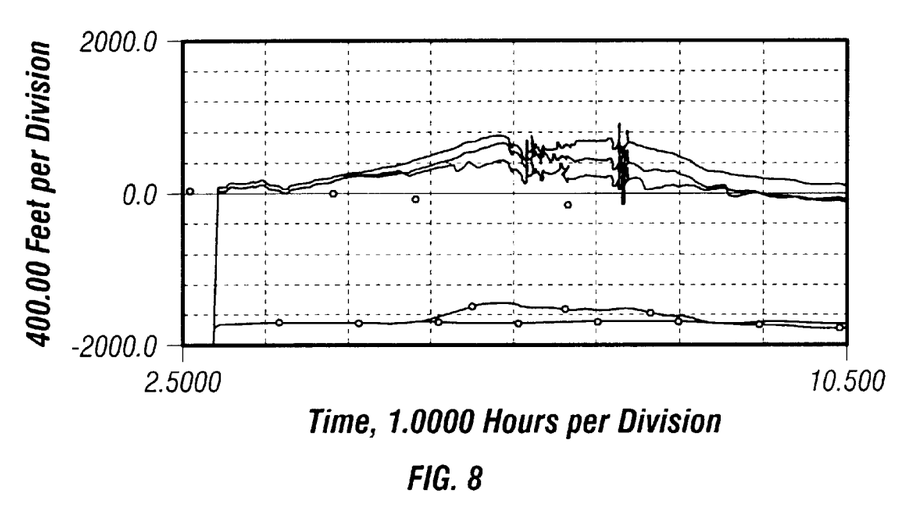
FIG. 8 shows a comparison of the gradient wind error model and the conventional barometric model using the data from flight number 1.

A comparison of the gradient wind error model and the conventional barometric model using the data from flight number 1 is shown in FIG. 8. The curve labeled "a" is the Blanchard algorithm error. The curves labeled "b" and "c" show the reduction in altitude error provided by four radar altitude measurements while using the conventional barometric and the gradient wind error models, respectively. The standard deviation obtained from the Kalman filter for two additional runs made without radar altitude measurement is superimposed the curves "a", "b", and "c". By using the gradient wind error model, the characteristic hump shape of the altitude error as a function of time is predicted. The relationship between the wind and the trajectory of the vehicle as expressed in Equation (22) is then provided to the Kalman filter, such that the correction value can be obtained from the characteristic hump shape of the altitude error as a function of time predicted by the Kalman filter.

Indeed, each of the features and embodiments described herein can be used by itself, or in combination with one or more of other features and embodiment. Thus, the invention is not limited by the illustrated embodiment but is to be defined by the following claims when read in the broadest reasonable manner to preserve the validity of the claims.

What is claimed is:

1. A method of determining an altitude of a flying object, comprising:

computing a Blanchard altitude of the flying object;

measuring a non-Blanchard reference altitude of the flying object;

comparing the Blanchard altitude and the non-Blanchard reference altitude to obtain a correction factor of the Blanchard altitude;

computing a radius of jet stream curvature as a function of the correction factor;

computing a gradient wind correction factor as a function of the curvature radius and a trajectory of the flying object; and correcting the Blanchard altitude in response to the gradient wind factor.

2. The method as recited in claim 1, wherein the step of measuring the non-Blanchard reference altitude includes measuring the non-Blanchard reference altitude from a GPS system.

3. The method as recited in claim 1, wherein the step of measuring the non-Blanchard reference altitude includes measuring the non-Blanchard reference altitude from a radar altitude measurement system.

4. The method as recited in claim 1, wherein the step of measuring the non-Blanchard reference altitude includes:

measuring an acceleration of the flying object; and performing a double integration of the acceleration.

5. The method as recited in claim 1, wherein the step of computing the radius of jet stream curvature includes processing the correction factor by a Kalman filter.

6. The method as recited in claim 1, wherein the step of computing the curvature radius further comprises computing the curvature radius from a linear relationship between the non-Blanchard reference altitude and an inverse of the radius of the jet stream curvature and a linear relationship between the non-Blanchard reference altitude and the trajectory of the flying object.

7. The method as recited in claim 6, wherein the gradient wind correction factor is inversely proportional to the radius of jet stream curvature.

8. The method as recited in claim 6, wherein the linear relationships between the non-Blanchard reference altitude, the trajectory and the inverse of the radius of the jet stream curvature include:

$$\frac{\partial z}{\partial (\delta h)} = 1 \text{ and } \frac{\partial z}{\partial (\delta u)} = -\int_0^T f(t)\,dt,$$

where z is the non-Blanchard reference altitude, $\delta h$ is the error of the trajectory, and $\delta u$ is the error of the inverse of the radius of the jet stream curvature, T is the total flying time of the flying object, and f(t) is a function of the flying time t.

9. The method as recited in claim 8, wherein the function f(t) is equal to $(w/g)(w_2 v_3 - w_3 v_2)$, where w is the velocity of wind, $w_2$ and $w_3$ are components of w along two directions perpendicular to the vertical direction, and $v_2$ and $v_3$ are velocity components of the flying object along the two directions.

10. The method as recited in claim 8, wherein the gradient wind factor is the product of the inverse of the radius of the jet stream curvature and an integration of the function f(t) over the flying time.

11. An inertial navigation and data system of a gradient wind error model, comprising:

a Blanchard altitude computing processor, operative to compute a Blanchard altitude of a flying object;

a reference altitude measurement system, operative to obtain a non-Blanchard reference altitude of the flying object;

an inertial measurement device, operative to measure a trajectory of the flying object;

a Kalman filter, operative to compute a radius of jet stream curvature in response to the non-Blanchard reference altitude received from the reference altitude measurement system and the trajectory received from the inertial measurement device; and a correction processor, operative to compute a gradient wind correction factor as a function of the radius of jet stream curvature and the trajectory to correct the Blanchard altitude received from the Blanchard altitude.

12. The system as recited in claim 11, wherein the non-Blanchard reference altitude measurement system includes a GPS system.

13. The system as recited in claim 11, wherein the non-Blanchard reference altitude measurement system includes a radar altitude measurement system.

14. The system as recited in claim 11, wherein the inertial measurement system includes an accelerometer operative to measure the acceleration of the flying object and to calculate the non-Blanchard reference altitude by a double integration of the acceleration.

15. The system as recited in claim 11, further comprising a sensor operative to measure temperature and pressure provided to the Blanchard altitude processor for computing the Blanchard altitude.

* * * * *